July 15, 1941.   S. BAXENDALE   2,249,196
NUT TAPPING MACHINE
Filed March 13, 1939   2 Sheets-Sheet 1
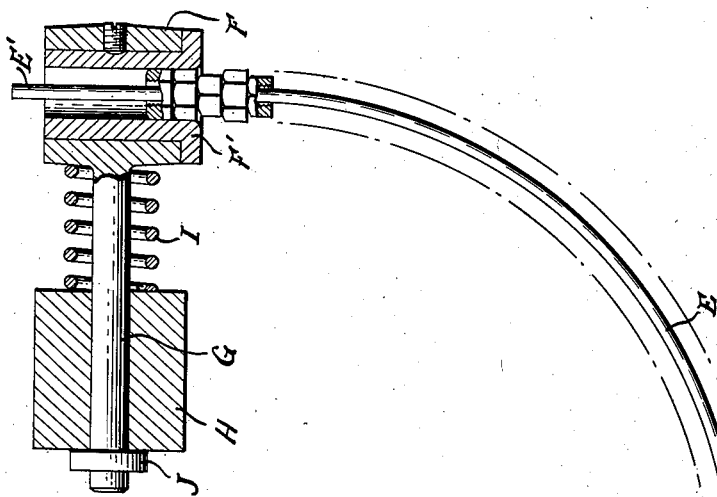
Fig. 1.
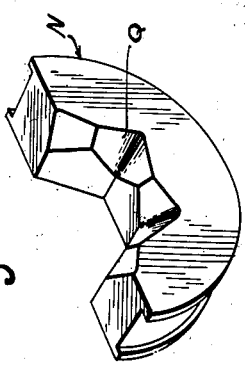
Fig. 5.
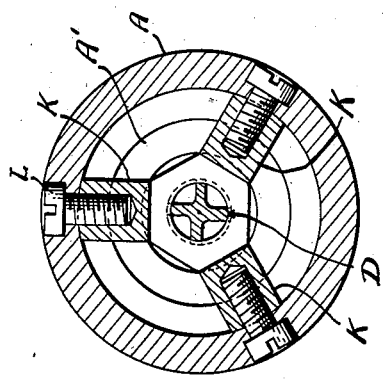
Fig. 4.
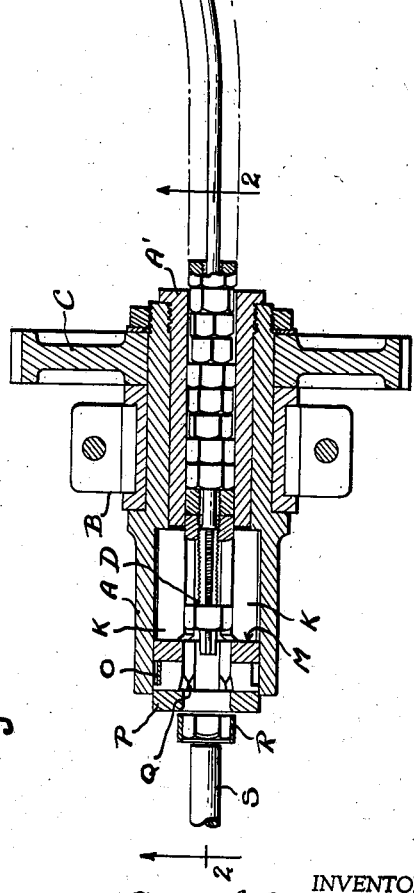
INVENTOR.
Samuel Baxendale
BY Whittemore Hulbert Belknap
ATTORNEYS

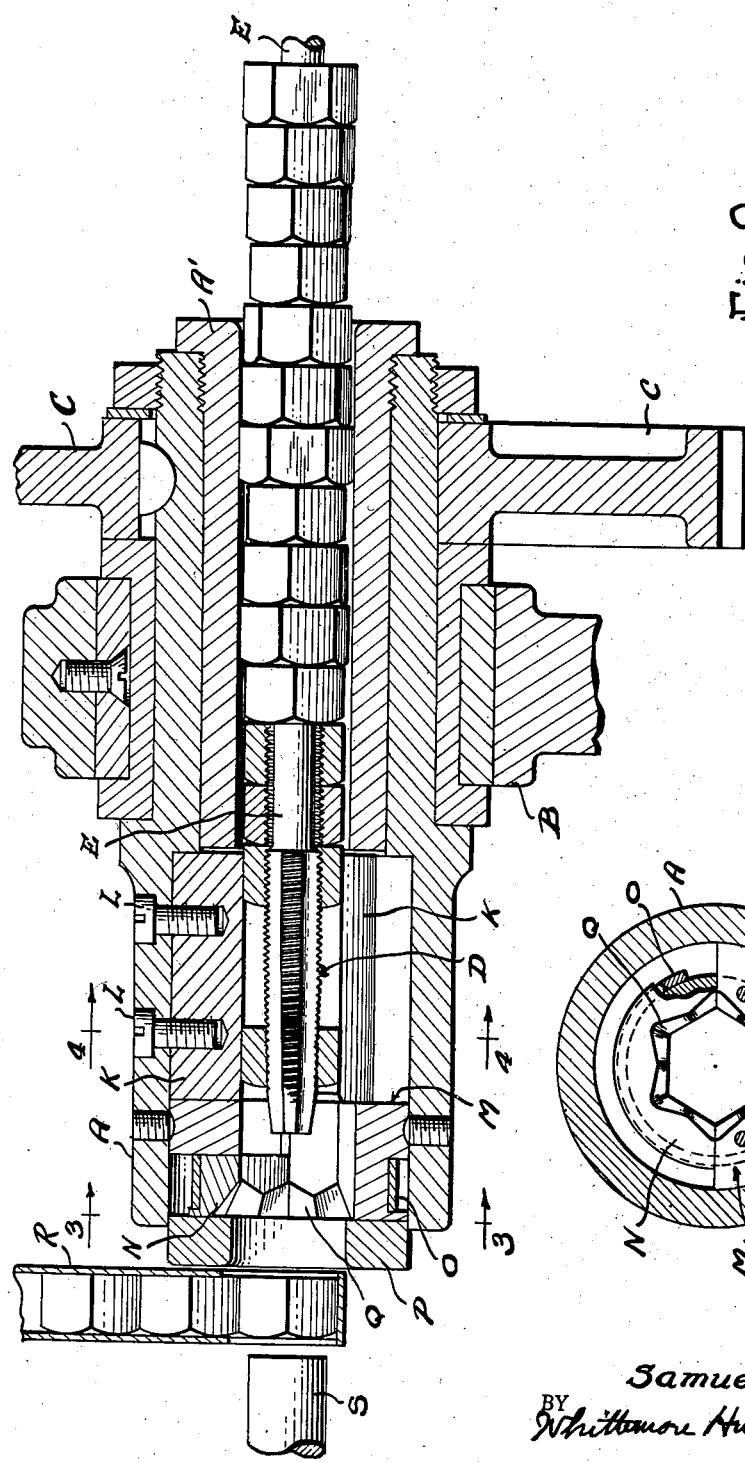

Patented July 15, 1941

2,249,196

UNITED STATES PATENT OFFICE 2,249,196

NUT TAPPING MACHINE

Samuel Baxendale, Dearborn, Mich., assignor to Modern Collet & Machine Company, Ecorse (Sta. Detroit, Mich.), a corporation of Michigan Application March 13, 1939, Serial No. 261,656

6 Claims. (Cl. 10—139)

The invention relates to nut tapping machines of that type in which the tap is provided with a curved shank over which the tapped blanks are fed and which extends through a supporting bearing of sufficient diameter for the passage of said blanks. It is one of the objects of the instant invention to avoid danger of stripping of the threads by providing greater freedom for axial movement of the tap relative to the blank in engagement therewith. It is a further object to obtain a construction which is adjustable for operation upon blanks of various dimensions, and still further it is an object to obtain a means for feeding the blanks into engagement with the tap, imparting thereto relative rotation and avoiding all danger of clogging. With these and other objects in view the invention consists in the construction as hereinafter set forth.

In the drawings:

Figure 1 is a horizontal section through my tapping machine taken in the axial plane of the tap;

Figure 2 is a longitudinal section on line 2—2 of Figure 1;

Figure 3 is a cross section on line 3—3 of Figure 2;

Figure 4 is a cross section on line 4—4 of Figure 2;

Figure 5 is a perspective view of one of the bushing members detached.

Nut tapping machines of the type above referred to have been heretofore constructed, first with revolving taps and stationary surrounding tubular guides; and second with revolving hollow spindles and non-revolving taps. My improved machine is of the latter type and comprises a hollow spindle A mounted in a suitable supporting bearing B and rotatively driven through the medium of a gear wheel C and any other suitable mechanism (not shown). Arranged axially within this hollow spindle is the tap D which is provided with a curved shank E terminating in a portion E' extending at right angles to the axis of the tap. F is a cylindrical sleeve surrounding the portion E' of the shank and mounted so as to be movable parallel to the axis of the tap. As shown, this mounting comprises a shank G slidably engaging a bearing H, which is in fixed relation to the bearing B. A spring I sleeved on the shank G yieldably moves the sleeve F away from the bearing H, and a collar J on the shank engaging the bearing limits this movement.

The internal diameter of the hollow spindle A is sufficient to receive nut blanks of maximum diameter. Inasmuch, however, as the machine is used with blanks of all sizes, the spindle is provided with exchangeable elements which are detachably secured thereto. These elements include: first, guiding means for the polygonal blank which centers the same with the axis of the spindle; and, second, means for imparting initial rotary movement to the blank when introduced into the spindle and for registering the same with said guiding means. The guiding means preferably consists of a series of bars K which when used with hexagonal blanks are preferably arranged 120° apart and are detachably secured within the spindle by suitable means, such as the screws L. The radial thickness of these bars is varied according to the diameter of the particular blank to be engaged therewith, and the spaces between the bars provide an exit for chips or shavings produced by tapping. Adjacent to the guide bars K there is arranged within the spindle A an exchangeable bushing M which has a polygonal orifice registering with said bars. A portion of this bushing is cut away on one side of the axis and in this space is arranged a complementary bushing portion N. This is capable of radial outward movement within the spindle A, but is normally yieldably held in fixed relation to the member M by a spring O. The latter, as shown, is a C-shaped band peripherally surrounding the member N and the complementary portion of the member M. Forward of these members is a circular guide P, which is of an internal diameter equal to the maximum diameter of the nut blank or dimension between diametrically opposed corners thereof. The forward side of the member N and also the complementary portion of the member M are fashioned to form a series of inclined channels Q for receiving the corners of the hexagonal blank in whatever position it may be with respect to the polygonal orifice. Thus when a blank is introduced through the circular orifice in the member P it will first engage these inclined channels and when further pressed inward will force the section N radially outward against the tension of the spring O. However, as the spindle is rotating, this together with the tension of the spring O, will move the blank into exact registration with the polygonal orifice through the member M. To hold the tap in axial alignment with the spindle the threaded blanks after disengaging from the tap teeth and while on the shank E should peripherally fit the spindle. This necessitates the use of exchangeable guide bushings A', which are of internal diameter corresponding to the internal diameter of the member P. Such bushings are inserted in the rear end of the spindle and together with the tapped blanks on the shank E hold the tap in position. I also provide exchangeable bushings F' in the sleeve F and which correspond in internal diameter to the bushing A' and exchangeable member P.

The machine is further provided with a chute R through which nut blanks are successively fed into axial registration with the end of the spindle A, and a plunger S is intermittently actuated to force the registering blank into the spindle through the guide P and into engagement with the members M and N, as above described. The means for feeding the nut blanks into the chute R may be of any suitable construction and forms no part of the instant invention.

With the construction as above described, the operation is as follows:

Assuming that the curved spindle E has thereon a series of nut blanks previously tapped, certain of these blanks will be upon the portion E' within the sleeve F. Thus, the torque stress imparted to the tap as an incident to the performance of its work, will be carried through the shank E and into the sleeve F. At the same time the nut blanks on the shank are free to move thereon through the sleeve F and out of engagement with said shank. The propelling force for moving the series of blanks on the shank E is the nut blank which is in engagement with the tap. However, while this nut blank is within the spindle A, there will be considerable frictional resistance to its movement due to engagement with the guides K. Consequently, there might be danger of stripping the threads before a sufficient number of tap teeth are in engagement with the blank. Such danger I have avoided by the provision for axial movement of the tap within the spindle, which is accomplished by the sliding movement of the shank G in the bearing H. The only resistance to such axial movement is the tension of the spring I (or other equivalent tensioning means, such as a counterweight) which is comparatively light and the friction of the shank G in the bearing H, which also is small. Therefore, when a nut blank contacts with the first tapering teeth of the tap, it will draw the tap forward into full engagement of all of the teeth. As soon as the threads in the blank are fully formed the lessened torque resistance will diminish the friction between the sides of the blank and the guides K, permitting the spring I to return the tap to its initial position. This cycle is repeated each time the plunger S forces a new blank into engagement with the tap.

All danger of clogging due to the wedging of a blank in the spindle is avoided by the yielding of the section N. This is capable of sufficient radial movement to clear the corners of the blank, but due to the fact that rotation of the blank is resisted by contact with the plunger S while the rotation of the spindle is continuous, the blank will automatically adjust to a position where the radial inward pressure of the spring O will force it into registration with the guides K.

What I claim as my invention is:

1. In a nut tapping machine, the combination with a rotary hollow spindle through which the nut blanks are fed, of a non-rotatable tap extending axially within said spindle and provided externally thereof with a large radius curved shank, a sleeve through which the end of said shank extends, said sleeve being of sufficient internal diameter for the passage of the nut blanks therethrough, and a support for said sleeve having means permitting movement thereof parallel to the axis of said tap while resisting rotation about said axis.

2. In a nut tapping machine, the combination with a rotary hollow spindle through which the nut blanks are fed, of a non-rotatable tap extending axially within said spindle and provided externally thereof with a large radius curved shank, a sleeve through which the end of said shank extends, said sleeve being of sufficient internal diameter for the passage of the nut blanks therethrough, a support for said sleeve permitting movement thereof parallel to the axis of said tap while resisting rotation about said axis, and resilient means for yieldably resisting said axial movement and for returning the tap to its normal position.

3. In a nut tapping machine, the combination with a rotary hollow spindle through which the nut blanks are fed, of a tap extending axially within said spindle and provided with a curved shank, a sleeve through which the end of said shank extends, said sleeve being of sufficient internal diameter for the passage of the nut blanks therethrough, a shank for said sleeve extending parallel to said tap, a bearing in which said sleeve shank is slidably mounted, and resilient means for resisting sliding movement of said shank in said bearing and for returning the parts to normal position.

4. In a nut tapping machine, the combination with a rotary hollow spindle and a tap extending axially within said spindle, of exchangeable guides detachably secured within said spindle for engagement with polygonal nut blanks of a predetermined size, means for introducing a nut blank into said hollow spindle and into registration with said guides, said means comprising an exchangeable member having a polygonal aperture therein corresponding to said blank and registering with said guides a radially outwardly yieldable section of said member, and resilient means for holding said section in normal position.

5. In a nut tapping machine, the combination with a rotary hollow spindle and a tap extending axially within said spindle, of exchangeable guides detachably secured within said spindle for engagement with polygonal nut blanks of a predetermined size, means for introducing a nut blank into said hollow spindle and into registration with said guides, said means comprising an exchangeable member having a polygonal aperture therein corresponding to said blank and registering with said guides a radially outwardly yieldable section of said member, resilient means for holding said section in normal position, a circular guide of an internal diameter to receive the maximum radial dimension of said blank, and a plunger for moving said blank axially of said spindle through said circular guide into engagement with said polygonal guide.

6. In a nut tapping machine, the combination with a rotary hollow spindle and a tap extending axially within said spindle, of exchangeable guides detachably secured within said spindle for engagement with polygonal nut blanks of a predetermined size, means for introducing a nut blank into said hollow spindle and into registration with said guides, said means comprising an exchangeable member having a polygonal aperture therein corresponding to said blank and registering with said guides a radially outwardly yieldable section of said member, resilient means for holding said section in normal position, a circular guide of an internal diameter to receive the maximum radial dimension of said blank, and a plunger for moving said blank axially of said spindle through said circular guide into engagement with said polygonal apertured member, the forward portion of said polygonal apertured member being provided with a series of inclined grooves for receiving the corners of the blank in what ever position it may be with respect to said polygonal aperture.

SAMUEL BAXENDALE.